(12) United States Patent
Winbom et al.

(10) Patent No.: US 8,315,940 B2
(45) Date of Patent: Nov. 20, 2012

(54) SYSTEM AND METHOD FOR RAPIDLY CALCULATING RISK IN AN ELECTRONIC TRADING EXCHANGE

(75) Inventors: Håkan Winbom, Sollentuna (SE); Ulf Ahlenius, Bromma (SE)

(73) Assignee: OMX Technology AB, Stockholm (SE)

( * ) Notice: Subject to any disclaimer, the term of this patent is extended or adjusted under 35 U.S.C. 154(b) by 28 days.

(21) Appl. No.: 13/090,779

(22) Filed: Apr. 20, 2011

(65) Prior Publication Data
US 2011/0264577 A1 Oct. 27, 2011

Related U.S. Application Data

(60) Provisional application No. 61/328,336, filed on Apr. 27, 2010.

(51) Int. Cl.
*G06Q 40/00* (2012.01)
(52) U.S. Cl. .............. 705/37; 705/35; 705/36 R; 705/38
(58) Field of Classification Search .................... 705/37, 705/35, 36 R, 38
See application file for complete search history.

(56) References Cited

U.S. PATENT DOCUMENTS

| | | | | |
|---|---|---|---|---|
| 4,412,287 | A * | 10/1983 | Braddock, III | 705/37 |
| 7,277,887 | B1 | 10/2007 | Burrows et al. | |
| 7,330,834 | B1 * | 2/2008 | LaPierre | 705/37 |
| 7,890,412 | B2 * | 2/2011 | Morano et al. | 705/37 |
| 8,160,951 | B2 * | 4/2012 | Braig et al. | 705/37 |
| 2002/0023034 | A1 * | 2/2002 | Brown et al. | 705/36 |
| 2002/0032638 | A1 * | 3/2002 | Arora et al. | 705/37 |
| 2002/0069155 | A1 * | 6/2002 | Nafeh et al. | 705/37 |
| 2003/0009411 | A1 * | 1/2003 | Ram et al. | 705/37 |
| 2003/0023543 | A1 * | 1/2003 | Gunewardena et al. | 705/38 |
| 2003/0083973 | A1 * | 5/2003 | Horsfall | 705/37 |
| 2003/0225672 | A1 * | 12/2003 | Hughes et al. | 705/37 |
| 2003/0225674 | A1 * | 12/2003 | Hughes et al. | 705/37 |
| 2003/0225675 | A1 * | 12/2003 | Failla et al. | 705/37 |
| 2003/0229566 | A1 * | 12/2003 | Moore et al. | 705/37 |
| 2003/0229570 | A1 * | 12/2003 | Hughes et al. | 705/37 |
| 2003/0233312 | A1 * | 12/2003 | Moore et al. | 705/37 |
| 2005/0137961 | A1 * | 6/2005 | Brann et al. | 705/37 |

(Continued)

OTHER PUBLICATIONS

Lime Brokerage Introduces Sponsored Access Solution for High-Frequency Trading Firms; Anonymous; Canada NewsWire; Ottawa: Mar 24, 2010; 3-pages.*

(Continued)

*Primary Examiner* — Gregory Johnson
(74) *Attorney, Agent, or Firm* — Nixon & Vanderhye P.C.

(57) ABSTRACT

Latency in electronic trading is dramatically reduced by delaying trade order validation until a match or trade can potentially occur. If a new order does not meet the matching criteria for an existing order in an order book, then the new order is stored in the order book without performing validation processing in a first example embodiment. In a second example embodiment, the order is stored in the order book before validation has completed. But if a new order meets matching criteria for an existing order stored in an order book, then order validation processing is performed for both of the matching orders. Once the order validation processing is successfully completed for both of the matching orders, then the trade is executed. Order validation processing includes both risk calculations and account validations, (e.g., checking to ensure the party has the necessary money or collateral if a buyer or is the owner if a seller). If the order validation processing is not successfully completed for both of the matching orders, then the trade is rejected.

22 Claims, 8 Drawing Sheets

U.S. PATENT DOCUMENTS

| | | | |
|---|---|---|---|
| 2005/0192888 A1* | 9/2005 | Lennane et al. | 705/37 |
| 2006/0190386 A1* | 8/2006 | Levy | 705/37 |
| 2006/0253377 A1* | 11/2006 | Burns et al. | 705/37 |
| 2007/0244791 A1* | 10/2007 | Feldhoffer et al. | 705/37 |
| 2008/0071664 A1* | 3/2008 | Silverman et al. | 705/37 |
| 2008/0221945 A1* | 9/2008 | Pace et al. | 705/7 |
| 2008/0288390 A1* | 11/2008 | Maynard | 705/37 |
| 2009/0030828 A1* | 1/2009 | Haller et al. | 705/37 |
| 2010/0017321 A1* | 1/2010 | Callaway et al. | 705/37 |
| 2010/0088216 A1* | 4/2010 | Czupek et al. | 705/37 |
| 2010/0100475 A1* | 4/2010 | Callaway et al. | 705/37 |
| 2010/0223200 A1* | 9/2010 | Balson et al. | 705/36 R |
| 2010/0287114 A1* | 11/2010 | Bartko et al. | 705/36 R |
| 2010/0332368 A1* | 12/2010 | Alderucci et al. | 705/37 |
| 2011/0066538 A1* | 3/2011 | Liberman et al. | 705/37 |
| 2011/0066568 A1* | 3/2011 | Milne et al. | 705/36 R |
| 2011/0087579 A1* | 4/2011 | Milne et al. | 705/37 |
| 2011/0119171 A1* | 5/2011 | Abrams | 705/37 |

OTHER PUBLICATIONS

Nasdaq to Launch Order Validation System; Wall Street Letter; New York; Jan 23, 2006; 2-pages.*

Nexa Technologies and TSX Datalink Form Partnership; Online Product News; Boynton Beach; Sep. 1, 2005; vol. 24, Iss. 9; 2-pages.*

International Search Report and Written Opinion mailed Jan. 20, 2012 in corresponding Application No. PCT/EP2011/056611.

* cited by examiner

Hyperion Scalable Unit (SU)
Figure 9B

SYSTEM AND METHOD FOR RAPIDLY CALCULATING RISK IN AN ELECTRONIC TRADING EXCHANGE

PRIORITY APPLICATION

This application claims priority from U.S. provisional patent application Ser. No. 61/328,336, filed on Apr. 27, 2010, the contents of which are incorporated herein by reference.

TECHNICAL FIELD

The technical field relates to automated trading exchanges.

BACKGROUND

Trading exchanges historically provided a location for buyers and sellers to meet to trade stocks, bonds, currencies, commodities, and other items. Electronic trading exchange systems use communications networks and computers to replicate traditional face-to-face exchange functions. For example, centralized exchange computers disseminate market information, maintain records and statistics, settle cash payments, determine risk-based margin requirements, and match trades.

A communications network connects the exchange computers to numerous trader sites. Trader stations, at the trader sites, operated by traders include interface functionality that enables traders to view prices and other information relating to products and to execute transactions by submitting orders and quotes. Orders are requests to buy or sell a specified amount of a particular security at a specified price. The securities available for trade, at the trading exchange, are electronically setup and represented by instruments at the trading exchange. An order for an amount of a particular instrument is thus related to the buying or selling of the security corresponding to the instrument. As an example, a trader may place an order to buy 100 shares of IBM stock at a bid price of 57.25. Quotes differ from orders in that quotes indicate bid price and ask prices, and bid and ask quantities for a particular instrument. Traders typically place an order to initiate a transaction. Professional market makers can place either orders or quotes, but tend to fulfill their role as a market maker by providing liquidity to a particular instrument by providing quotes for the instrument and thereby creating a market. Orders are stored in an order book which is a list of buy and sell orders available to be matched or maintained for each security that is traded in the system. Each order includes a quantity and a price. Various trading information is disseminated and displayed to allow traders to quickly identify market opportunities and act on them in the hope of generating profits.

An ongoing goal of electronic trading exchanges is to provide low latency associated with the trading process. Trading latency is the time for an exchange to process an order or quote received from a trader and either reject it, execute it, or place it in an order book for possible future execution. By providing low trading latency, a trader can react faster to changes in the market. Fast reaction is particularly important for "algorithmic traders" (computers) that place orders in the trading exchange according to certain principles. Algorithmic traders are important customers for trading exchanges because they provide substantial liquidity in the market.

In addition to low latency, it is also important to control the risk associated with electronic trading including the creditworthiness of the entity placing the order. For example, securities trading involves some risk regarding whether the trading counterparty will pay for securities traded in a trading day. This risk is an issue in bilateral trading where the exchange acts as a broker as well as in situations where the exchange acts as a central counterparty. The risk may be even greater for financial instruments or products like options, futures, derivatives, etc. where the parties agree to buy/sell in the future. As a result, most exchanges require exchange "members" to post some collateral and set limits on each member's trading activity based on that collateral. Another example risk "check" relating to selling a security might be to verify that the number of securities specified in the order is the number actually registered for the seller's account. In some areas of the world, regulators explicitly forbid "short selling," e.g., sending in a sell order for a security one does not own.

One way to reduce risk is to perform pre-order validation. Consider FIG. 1 which checks whether received orders are valid or invalid by performing pre-order validation. An invalid order might be one that is too risky based on one or more risk criteria and is therefore rejected. On the other hand, an approved/validated order is forwarded to a gateway computer 12 that may perform other matching functions like user authentication and other security-related functions. The gateway computer 12 passes the approved order on to a matching engine 14 that matches the order if possible or stores it unmatched in an appropriate order book 15. As explained above, the order book 15 manages the list of buy and sell orders available to be matched or maintained for each instrument that is traded in the system.

Figure 1:
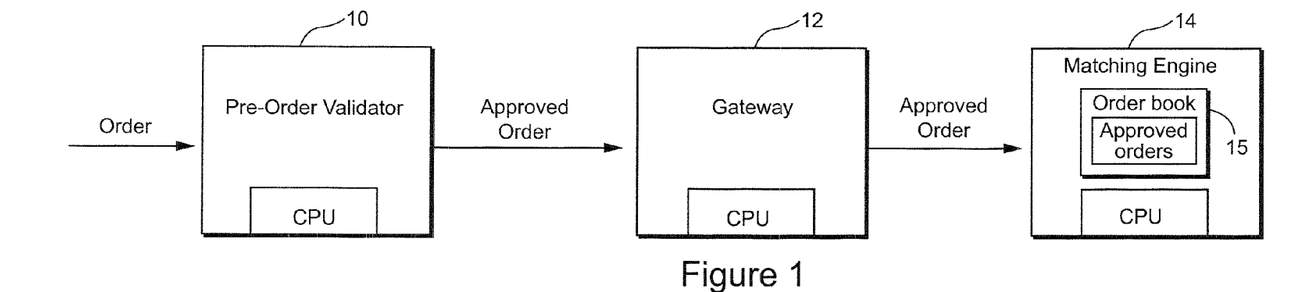
FIG. 1 illustrates an example of serial or sequential pre-order validation followed by order book entry or order matching.

In this way, the current risk for a trader is controlled per order before any matching. For example, if an order exceeds a risk limit associated with the trader, the exchange, etc., the pre-order validation computer 10 can reject it. If the order is accepted, the pre-order validation computer 10 can update the current possible risk level.

The problem with this approach is that pre-order validation is made in sequence. The matching engine 14 must wait for the pre-order validation computer 10 to finish its processing and generate the approved order before the matching engine 14 can perform its trading functions. That pre-order validation delay increases trading latency. As an example, assume that each of the pre-order validation computer 10, gateway 12, and matching engine 14 requires 100 µs to process an order. The total minimum trading latency of the order is then 300 µs. This latency problem quickly escalates as the number of trades increases. As mentioned above, for example, algorithmic traders may trade with very high frequency and very high volume, making order latency a significant issue for electronic trading exchanges. As the volume of orders and quotes increases, the burden and delay with calculating the risk on every order entered also increases.

SUMMARY

According to a first aspect, a trade order processing method and apparatus are provided for reducing trade order processing latency in an electronic trading exchange. The electronic trading exchange receives trade orders to be matched against trade orders stored in a trade order book in a memory. At least some of the received trade orders are stored in the trade order book before validating those received trade orders for trading risk. A determination is made whether a first one of the received trade orders matches a second trade order stored in the trade order book. The electronic trading exchange verifies that the matched first and second trade orders are trade risk validated before executing a trade of the matched first and second trade orders. Validating the trade orders includes calculating a risk associated with the trade orders and/or confirming properties of an account associated with the trade orders.

According to a second aspect, a non-transitory computer-readable storage medium having computer readable code embodied therein for executing the trade order processing method described in the preceding paragraph.

In a first, non-limiting embodiment, the first trade order is stored in the trade order book if it does not match the second trade order. The first trade order and the second trade order are validated after it is determined that the first one of the received trade orders matches the second trade order. In a second, non-limiting embodiment, the determination of whether the first trade order matches the second trade order is executed in parallel with validating one or both of the first and second trade orders. In both embodiments, a trade order stored in the trade order book is removed if the trade order is found invalid.

A third aspect relates to an electronic trading exchange apparatus that includes a memory configured to store a trade order book for storing trade orders and a data processor, coupled to the memory, for reducing trade order processing latency when matching trade orders in an electronic trading exchange. The data processor is programmed to: receive a first trade order for executing a trade with a second trade order stored in the trade order book, determine if the first trade order matches the second trade order stored in the trade order book before validating the first and second trade orders for trade risk, store the first trade order in the trade order book without trade risk validating the first trade order if the first trade order does not match the second trade order, validate the first trade order and the second trade order for trade risk after the first trade order matches the second trade order, and execute a trade of the matched first and second trade orders if the first and second trade orders are successfully trade risk validated.

A fourth aspect relates to an electronic trading exchange apparatus that includes a memory configured to store a trade order book for storing trade orders and a processor, coupled to the memory, for reducing trade order processing latency when matching trade orders in an electronic trading exchange. The processor is configured to: receive trade orders to be matched against trade orders stored in the trade order book, store at least some of the received trade orders in the trade order book before validating those received trade orders for trade risk, and determine in parallel operations whether a first one of the received trade orders matches a second trade order stored in the order book and whether the first and second trade orders are valid trade orders from a trade risk standpoint. The processor is further configured to complete the parallel operations before executing a trade of the matched first and second trade orders.

In one non-limiting example implementation, a first validation status marker is assigned to the first trade order and a second validation status marker is assigned to the second trade order. The first and second validation status markers indicate whether the first trade order or the second trade order has undergone validation processing. The validation status markers contain a status indicator from a group including at least one of: accepted, not accepted, and not yet calculated.

Once the status of the first validation status marker is determined, the processor can perform various operations. For example, it can either reject the first one of the received trade orders or remove the first one of the received trade orders from the trade order book if the status of the first validation status marker is not accepted. The processor can store the first one of the received trade orders in the trade order book if the first one of the received trade orders does not match the second trade order and the first validation status marker is accepted, and thereafter, the processor can determine the status of the second validation status marker if the first one of the received trade orders matches the second trade order and the first validation status marker is accepted. Alternatively, the processor may store the first one of the received trade orders in the trade order book if the first one of the received trade orders does not match the second trade order and the status of the first validation status marker is not yet calculated. Yet another alternative is for the processor to validate the first trade order if the first trade order matches the second trade order and the status of the first validation status marker is not yet calculated and validate the second trade order if the status of the first validation status marker changes from not yet calculated to accepted and the status of the second validation status marker is not yet calculated.

In a non-limiting example implementation, the processor matches the first trade order and the second trade order using a single-threaded processing and validates the first trade order and the second trade order using multi-threaded processing.

In another non-limiting example implementation, the electronic trading exchange apparatus is implemented on a high performance computing system that includes multiple parallel clusters of computing nodes coupled to shared memory to reduce order processing latency. Alternatively, the electronic trading exchange apparatus is implemented on a high performance computing system that includes a shared nothing computing architecture combined with dedicated hardware to reduce order processing latency. Still another alternative implements the electronic trading exchange apparatus on a high performance computing system that includes shared memory and shared nothing computer architectures to reduce order processing latency.

DETAILED DESCRIPTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions. Although databases may be depicted as tables below, other formats (including relational databases, object-based models and/or distributed databases) may be used to store and manipulate data.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process is a description of an apparatus for performing the process. The apparatus that performs the process can include, e.g., a processor and those input devices and output devices that are appropriate to perform the process.

Various forms of computer readable media may be involved in carrying data (e.g., sequences of instructions) to a processor. For example, data may be (i) delivered from RAM to a processor; (ii) carried over any type of transmission medium (e.g., wire, wireless, optical, etc.); (iii) formatted and/or transmitted according to numerous formats, standards or protocols, such as Ethernet (or IEEE 802.3), SAP, ATP, Bluetooth, and TCP/IP, TDMA, CDMA, 3G, etc.; and/or (iv) encrypted to ensure privacy or prevent fraud in any of a variety of ways well known in the art.

The technology in this case may be used in any type of trading exchange. The term order is used comprehensively and includes any offer to buy and/or sell and encompasses quotes, for example. An order includes an order for a financial instrument for which the trading exchange will execute a trade with a matching order. A financial instrument includes an instrument that evinces ownership of dept or equity, and/or any derivative thereof, including equities, stocks, fixed income instruments, bonds, debentures, certificates of interest or deposit, warrants, options, futures, forwards, swaps, or generally any security. A trade fulfills part of an order for one or more things if the trade includes transfers of ownership of at least a portion of the one of more thing in accordance with the order.

The inventors recognized that the latency can be dramatically reduced by delaying order validation until a match or trade can potentially occur. If a new order does not meet the matching criteria for an existing order in an order book, then the new order is stored in the order book without performing validation processing in a first non-limiting example embodiment. In a second non-limiting example embodiment, the order is stored in the order book before validation has completed. But if a new order meets matching criteria for an existing order stored in an order book, then order validation processing is performed for both of the matching orders. Once the order validation processing is successfully completed for both of the matching orders, then the trade is executed. Order validation processing includes both risk calculations and account validations, (e.g., checking to ensure the party has the necessary money or collateral if a buyer or is the owner if a seller). If the order validation processing is not successfully completed for both of the matching orders, then the trade is rejected.

In the first non-limiting example embodiment, the new order is stored in the order book without performing any order validation processing. In other words, order validation processing is skipped entirely if the order is never matched or postponed until a potential match is identified. This approach saves considerable processing resources and reduces latency. So the total amount of calculations is dramatically reduced. By eliminating the validation processing, the time needed to store an order in the order book is also significantly decreased. If an order is later matched, validation processing is then performed. In this way, validation processing is performed only when it is needed.

In the non-limiting second example embodiment, the new order is stored in the order book while performing order validation processing in parallel. The time for validating a matched order can be reduced or completely eliminated if the validation can be completed before an order match occurs. If the validation process determines that the order should be rejected, then the order may be deleted from the order book and a message sent to the relevant parties that the order was invalid. If the order is validated without a current valid matching order, the order may be indicated as valid in the order book and matched if a valid matching order is ever received. If the parallel validation process is not complete when a valid matching order is detected in the order book or subsequently received, then the match/trade execution is stayed pending the completion of the necessary validation. Because both the order validation and the matching processing receive an order at the same time and process the information in parallel, trading latency is significantly reduced while still achieving rigorous risk protection.

The technology leverages the fact that the percentage of placed orders that ultimately result in a trade is actually decreasing. While in the past, almost all orders eventually traded, today typically less than one percent of all orders placed actually result in a trade. Therefore, the risk associated with a trading exchange accepting an order and placing it in the order book is not a concern. Because the risk associated with placing the order in the order book is only an issue when the order actually trades, the risk evaluation does not have to be completed or even started when an order is placed in the order book. Rather, that risk evaluation only needs to be done when that order matches. So the matching engine waits for completion of the risk validation process for an order before completing a match for the order. The percentage of trades for which there is an immediate match ready when an order is initially received is relatively small.

If an order is placed in the order book before risk validation has completed, but the party submitting the order has such marginal collateral that this order can not be accepted (e.g., it would have been rejected by synchronous risk validation) the consequence is that the exchange shows slightly more liquidity than is actually present. However, such a risky order shows an interest to buy/sell at a certain price level and can be valuable to the market as a whole.

In one example implementation for the second example embodiment, each order in the order book is associated with a validation status marker. The matching process may not match orders without a positive validation status marker. When an order is entered, risk evaluation calculations are started. Risk evaluation calculations may be performed using one or more of a multitude of methods, e.g., a separate thread in a multicore system where the matching engine and order validator communicate in a shared memory, an external software approach, or a dedicated hardware solution. Once the risk calculation is completed, the order validator 38 sets a positive or negative validation status marker for risk evaluation for this order. In the exceptional case where there is a high risk situation detected, e.g., when there is not enough collateral, the order is removed from the order book.

By removing the risk calculation from the latency critical processing of most orders entered into an exchange, the exchange can offer very competitive order latency, but still effectively operate as if all orders were risk-evaluated when entered in the order book. As such, the financial risk of accepting orders without risk validation is eliminated.

Figure 2:
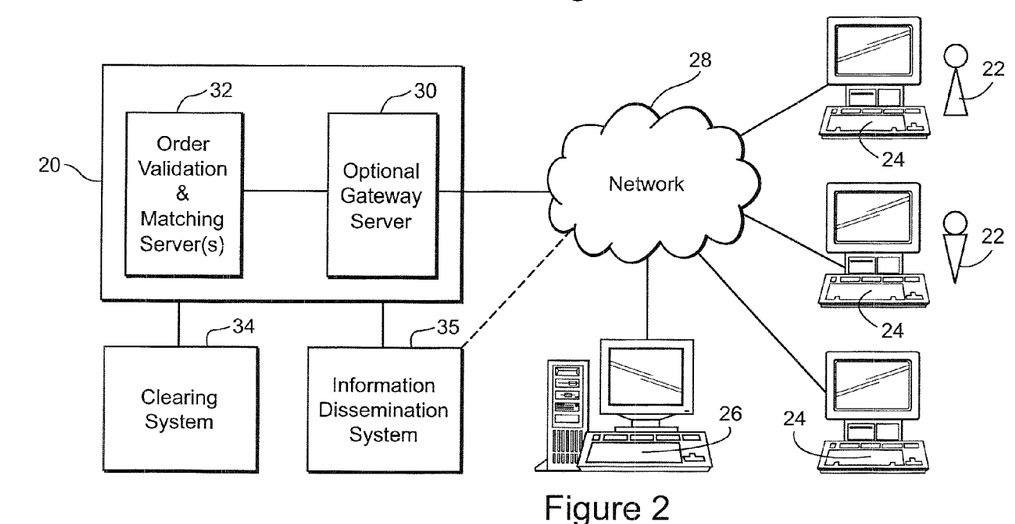
FIG. 2 illustrates an example electronic trading exchange.

FIG. 2 shows an example of a computerized electronic trading system with a number of trading terminals 24. At some of the trading terminals, a human trader 22 creates an order for an instrument trade and then sends the order via the trading terminal. An algorithmic external trading machine 26 may also be used for creating and sending in orders to a computerized central exchange 20 that includes one or more order validation and matching computer server(s) 32. The algorithmic external trading machine 26 is much faster as compared to a human trader 22. It may receive message flows such as Market By Order (MBO) flow, Market By Price (MBP) flow, etc., sometimes referred to as market data feed. Based on the information received, the algorithmic external trading machine 26 is programmed to execute one or more algorithms depending on the received information to rapidly react to market changes due to political, economic, or other reasons that can have an impact on the prices of the instruments traded.

A trading terminal sends an order message via a network 28 to the computerized central exchange 32 via an optional gateway server 30. The optional gateway server 30 may be used to perform user authentication, security related, and/or other processes. The computerized central exchange 32 performs parallel operations including validating the order while also trying to match the order with a counter order using order validator and matching servers. The order messages may be sent using FIX standard protocol or any other suitable protocol that makes it possible for the computer devices to communicate with each other. If the matching server(s) can not immediately match the order when received, then the matching server(s) stores the order in an order book that is a part of the memory of the computerized central exchange system 32. Example order validation processing includes risk calculations and account validations, e.g., checking to ensure a party has the necessary money or collateral if a buyer or is the owner if a seller. If the matching server(s) executes a trade, it provides the "deal" or "trade" to a clearing system 34 and to an information dissemination system 35.

Figure 3:
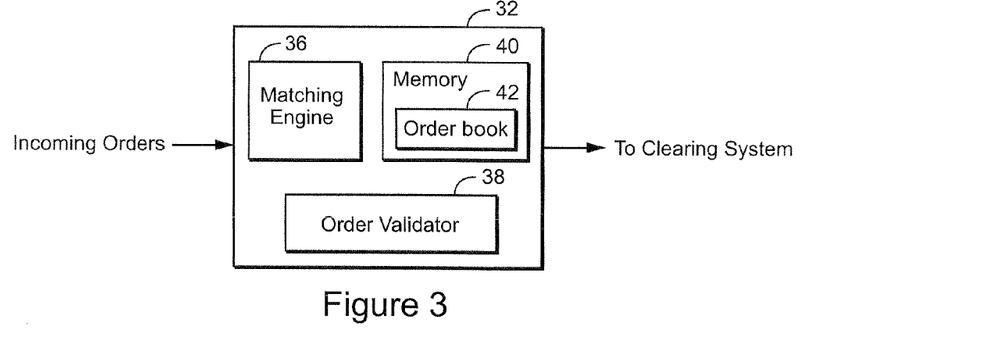
FIG. 3 illustrates an example of an order validation and order matching server(s) in the electronic trading exchange of FIG. 2.

FIG. 3 illustrates an example of an order validation and order matching server(s) in the electronic trading exchange of FIG. 2. Incoming orders are processed by a matching engine 36 and then only if a match is made by an order validator 38 in the first example embodiment. In the second example embodiment, the matching engine 36 and order validator 38 process incoming orders in parallel and communicate to coordinate their respective functions. They also share access to a memory 40 which stores an order book 42.

Figure 4:
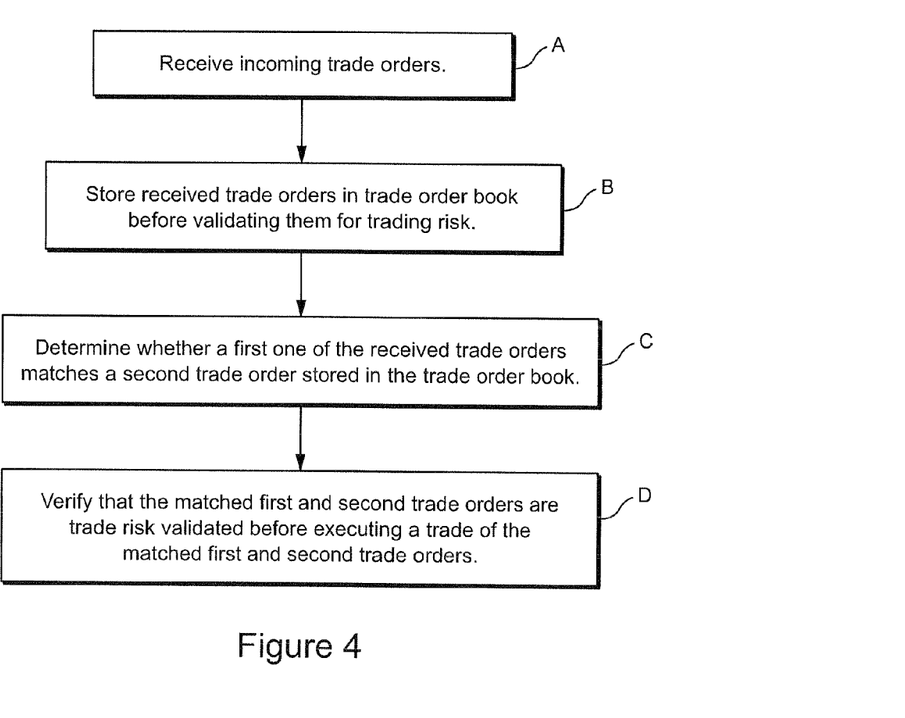
FIG. 4 is a flowchart diagram of an example trade order processing method that reduces trade order processing latency in an electronic trading exchange.

FIG. 4 is a flowchart diagram of an example trade order processing method that reduces trade order processing latency in an electronic trading exchange that encompasses both the first and second example embodiments. In step A, the electronic trading exchange receives trade orders to be matched against trade orders stored in a trade order book in memory. At least some of the received trade orders are stored in the trade order book before validating those received trade orders for trading risk (step B). A determination is made by a matching engine whether a first one of the received trade orders matches a second trade order stored in the trade order book (step C). Before executing a trade of the matched first and second trade orders, the exchange verifies that the matched first and second trade orders are trade risk validated (step D).

Figure 5:
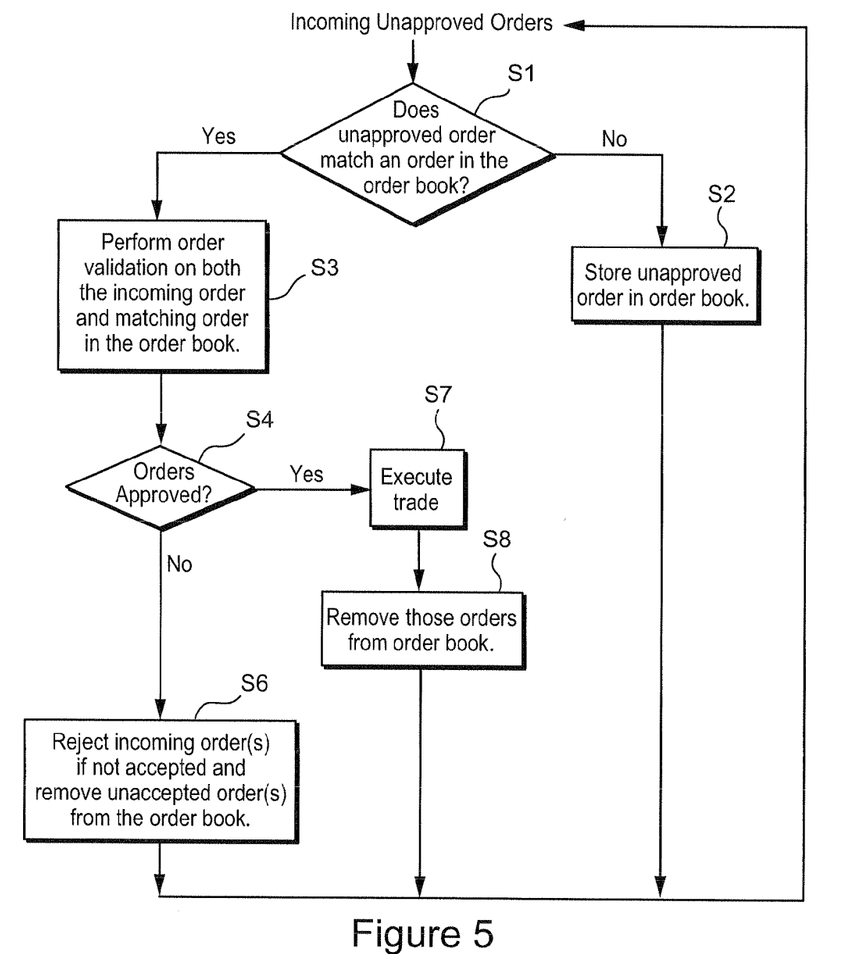
FIG. 5 is a flowchart diagram illustrating non-limiting example steps for processing incoming trade orders in a matching engine that have not been first validated/approved in accordance with a first non-limiting example embodiment.

FIG. 5 is a flowchart diagram illustrating non-limiting example steps for processing incoming trade orders in a matching engine that have not been first validated/approved in accordance with a first non-limiting example embodiment. For each incoming unapproved order (i.e., the order has not been validated), a determination is made whether the unapproved order matches an order in the order book (step S1). If not, the unapproved order is stored in the order book (step S2). If so, order validation is performed on the order (step S3). A determination is made in step S4 whether the matching orders are both validated or approved. If so, the matching engine executes the trade or match (step S7), and removes the orders from the order book if they are stored there (step S8). If the order(s) is(are) not approved, then the unapproved order(s) is(are) rejected and removed from the order book (step S6). An optional timeout may be employed to limit how long the approval process may continue without concluding that the order is accepted or not accepted.

Figure 6:
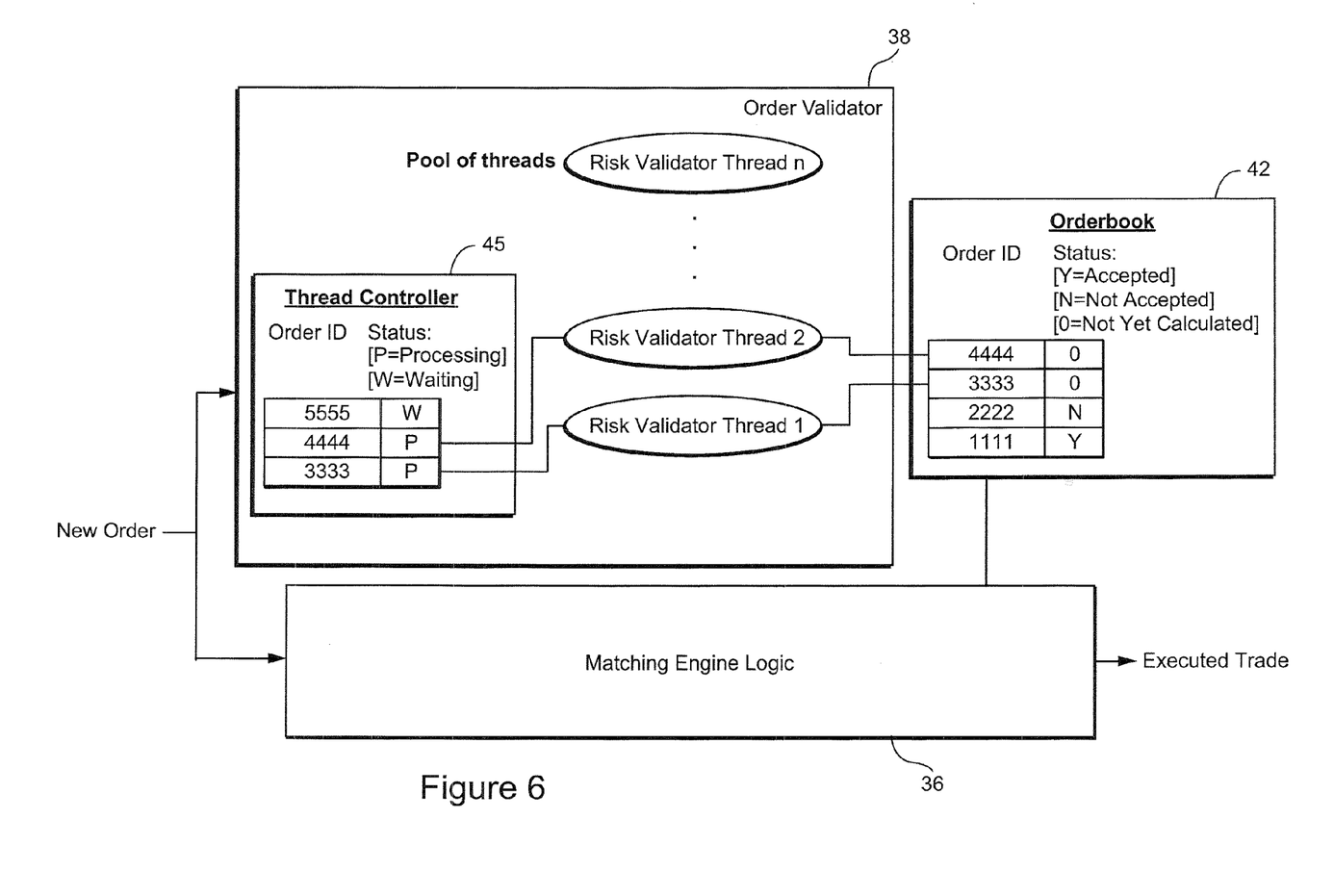
FIG. 6 illustrates a non-limiting example implementation in accordance with a second non-limiting example embodiment using deterministic, single-threaded processing for the matching engine and multi-threaded parallel processing for risk validation.

FIG. 6 illustrates one non-limiting example implementation for the second example embodiment that includes parallel deterministic, single-threaded processing for the matching engine and multi-threaded processing for risk validation. The matching engine 36 and order validator 38 are shown conceptually in FIG. 5 and both receive a new order with a unique order ID to be processed in parallel. The matching engine uses a deterministic, single-threaded operation. A deterministic process behaves predictably in that when given a particular input, the deterministic process always produces the same output and the machine always passes through the same sequence of states. Electronic trading systems use a deterministic system so that the output is a well-documented matching result which only depends on the series of input data. This architecture is a key requirement for most investors using a trading system for matching orders because investors are unwilling to risk having their orders treated any other way. A thread is a thread of execution by a computer process. On the other hand, order validation processes are multi-threaded which means that a multi-threaded process being performed by a computer includes two or more threads of execution being performed in parallel.

So rather than pre-validating orders before putting them in the order book, validation calculations are performed in parallel with the matching engine execution. Multi-threaded order validation (each order is validated using its own thread of execution) increases processing efficiency even further, e.g., by utilizing the architecture of multi-core computers. Latency is decreased by performing the order validation in parallel with the matching engine. By performing the order validation in parallel for many orders in order book, the total latency is reduced even further.

The matching engine 36 stores the new order in the order book 42 with its unique order identifier, e.g., 1111, 2222, 3333, 4444, etc. The new order is also received by a thread controller 45 in the order validator 38 which saves the order, its order identifier, and a corresponding status to each received order. Both the matching engine 36 and the thread controller 45 use the same order identifier. The order identifier may be generated in a variety of ways. The thread controller 45 assigns a particular risk validator thread to perform the order validation operation process(es). Example order validation statuses include P for processing and W for waiting. The outputs from the multiple risk validation threads are stored as markers in the order book 42 where each order has an associated validation status including Y for an accepted or valid order, N for a not accepted or invalid order, and 0 for a validation status not yet calculated. The order validator 38 may preferably include a time limit by which all risk validator threads must have either accepted or not accepted a received order. Once the time limit is exceeded, the order is automatically set to a non-accepted or invalid status, and a message may be sent to the originator of the order indicating that the order is invalid. The matching engine 36 removes invalid orders from the order book 42. In some example embodiments, the order validator 38 sends a order status update to the matching engine, which updates the status of the order in the order book. In some example embodiments, the order validator 38 stores order status updates in the order book directly.

In parallel with the order validation thread processing activities, the matching engine logic 36 tries to match the incoming order with an order existing in the order book 42 for the financial instrument at issue in the order. If no match is currently possible for the new order, then the matching engine stores the order for potential future matching in the corresponding order book. If the validation status for the order becomes "accepted" by the order validator, then the order may be matched immediately if a matching validated order becomes available. If the validation status for the order becomes "not accepted" by the order validator, then the order is removed from the order book. If the validation status for the order remains "not yet calculated" and a matching counter order exists, then those orders remain unmatched in the order book until they are both validated or invalidated.

Figure 7:
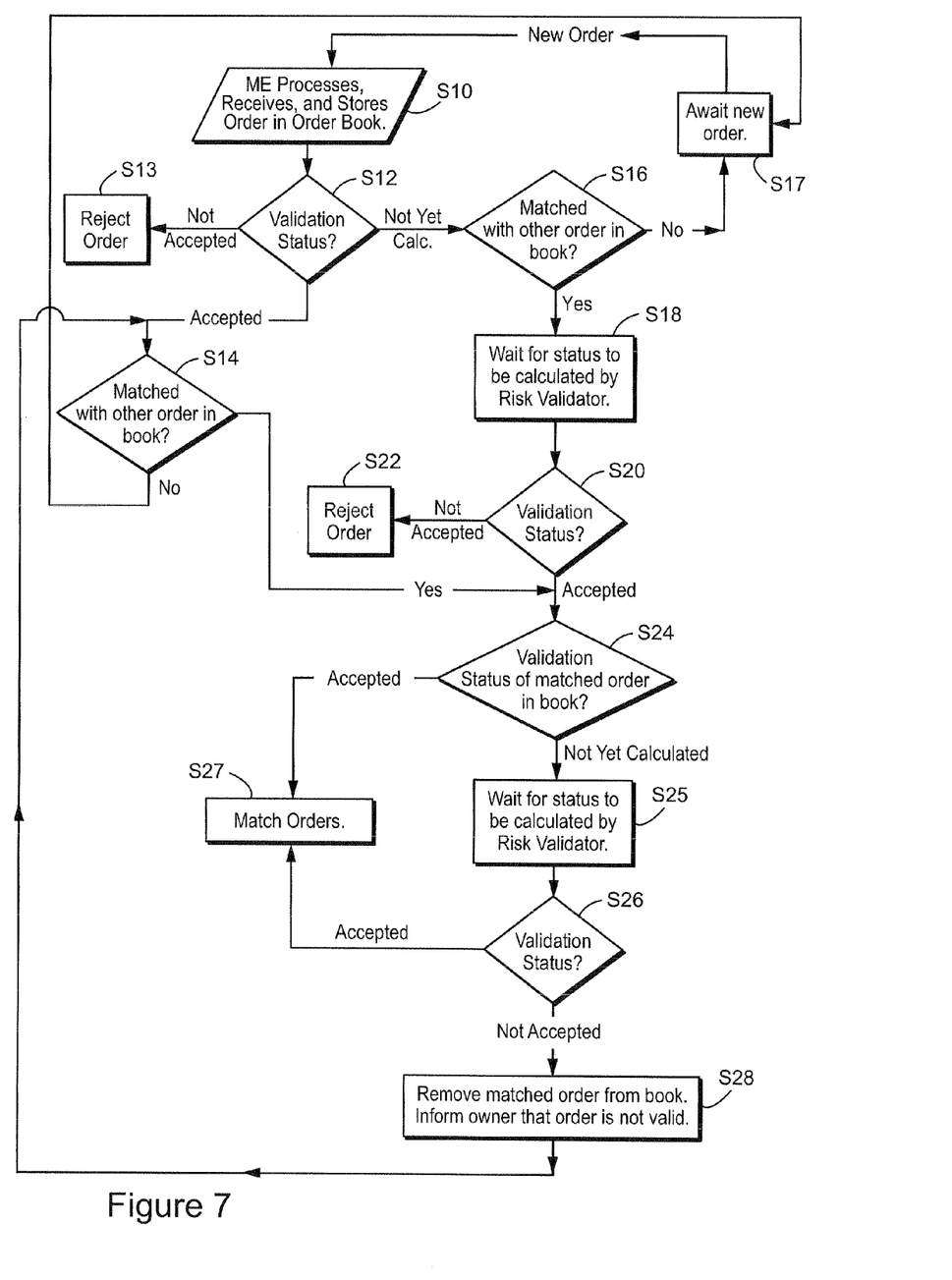
FIG. 7 is a flowchart diagram illustrating non-limiting example procedures for parallel order validation and order matching in an electronic trading exchange based on the implementation shown in FIG. 6 in accordance with the second non-limiting example embodiment.

FIG. 7 is a flow chart diagram illustrating non-limiting example procedures followed by the matching engine for the second example embodiment that employs parallel order validation and order matching in an electronic trading exchange. As explained, new orders are accepted by the matching engine 36 and placed in the order book 42 before the validity of the order is determined. That means that the order book 42 may be storing one or more orders that are not valid orders. As long as those non-validated orders are not matched, there is no risk to a counterparty associated with trading with a party with an invalid order. As explained in the background, securities trading involves some risk regarding whether the trading counterparty will pay for securities traded in a trading day. Only after the order is validated or invalidated will the risk become real. Therefore, if an input order can be immediately matched when received by the matching engine logic, the matching engine must defer the match until the validator accepts or rejects the order. Orders that have a validation status of "0" or "not yet calculated" can not be immediately matched and must be held at least temporarily until that status is resolved one way or the other.

Step S10 indicates that the matching engine (ME) receives a next new order, performs some preliminary processing, and stores the order in the order book. Initially, a newly-received order is stored in the order book with a default validation status of "not yet calculated." As shown in FIG. 6, the order is also provided to the order validator 38, which processes the order in parallel with the matching engine. The order validator 38 operates using multiple threads to determine the validation status of multiple orders. So the timing of when received orders are validated and when the validation status values are updated in the order book by the order validator 38 is not coordinated with the operation of the ME.

In any event, the matching engine checks the validation status of that order in step S12. If the validation status is indicated to be "not accepted," then the order is rejected in step S13. If the validation status for the order is "accepted," then a decision is made whether the accepted order is matched with some other order in the order book in step S14. If not, control returns to step S17 where arrival of a new next order is awaited by the ME. However, if the accepted order is matched with some other order in the order book, then control proceeds to decision block S24 described below.

If the validation status of the processed order in step S12 is not yet calculated ("0"), then a determination is made in step S16 whether that order X has been matched with some other order in the order book. If not, then control proceeds to step S17 to await a new next order to by processed by the matching engine. In parallel with the matching engine processing the next new order, the validation status is calculated in the order validator 38 initiated by the thread controller. If the order is validated, the order validator updates the status of order X to "accepted" in the order book. But if the order X is found to be invalid or "not accepted," it is removed from the order book, and the owner informed that it is invalid. But if the order is matched with another order in the order book, then the matching engine waits for the validation status to be calculated by the pre-order validator in step S18. The validation status is checked again in step S20, and if "not accepted," then the order is rejected in step S22. If the validation status for the order is "accepted," then the validation status of the matched order in the order book is determined in step S24. If that order book order is accepted by the order validator, then the orders are matched in step S27. On the other hand, if the validation status of the matched order in the order book is "not yet calculated," then the matching engine waits for its status to be calculated by the order validator in step S25. The validation status of the matched order in the order book is checked again in step S26. If "accepted," then the orders are matched in step S27. If "not accepted," then the matched order is removed from the order book, and the owner of that order is informed that it is invalid in step S28. The matching engine then checks if the received order X matches any other order in the order book in step s14. If another match is found, then the status of the matching order is checked in S24, or if no match exists, control returns to step S17 where arrival of a new next order is awaited by the ME.

Figure 8:
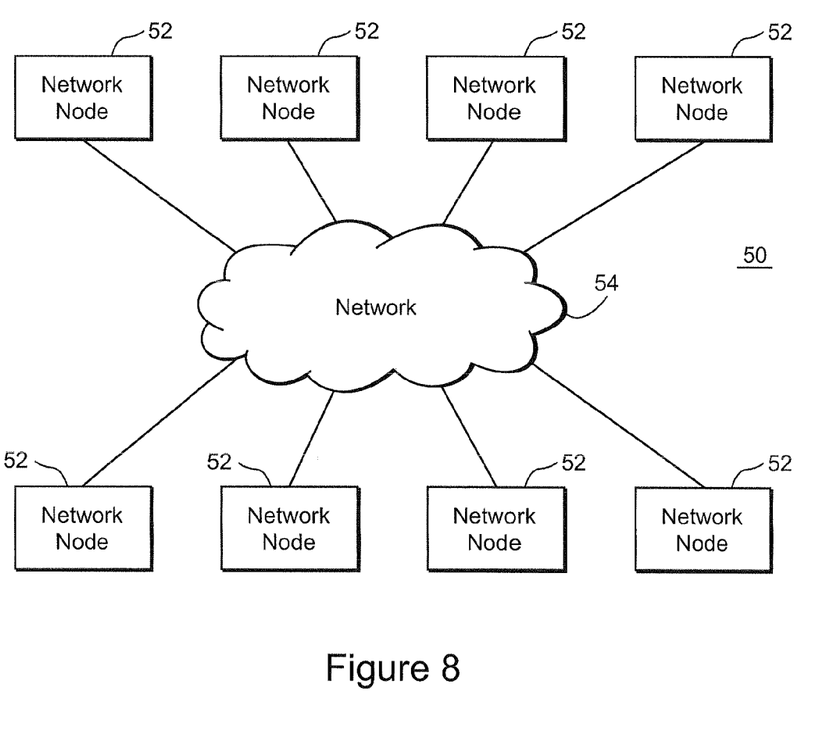
FIG. 8 is a non-limiting example distributed computing structure that may be used to implement the parallel order validation and order matching in an electronic trading exchange in accordance with the second non-limiting example embodiment.

FIG. 8 is a non-limiting example of a distributed computing structure that may be used to implement the parallel order matching and multi-threaded order validation in an electronic trading exchange for the second example embodiment. A computer cluster network 50 includes a plurality of network nodes 52 communicatively coupled or interconnected by a network fabric 54. The computer cluster network 50 may include an enhanced performance computing system that supports high-bandwidth operation in a scalable and cost-effective configuration. Order data can be transmitted between network nodes 52 via the network fabric 54.

Any suitable high performance computing architecture may be used. First generation high performance computing is typically performed on mainframes with multiple CPUs using shared memory. Second generation high performance computing typically uses a cluster of CPU nodes, e.g., 1024 CPUs, interconnected by various means. Third generation high performance computing uses relatively inexpensive symmetric multiprocessing (SMP) where two or more identical processors are connected to a single shared main memory and are controlled by a single operating system instance. For example, clusters may be built with 1024 nodes each comprising 4 SMP CPU's.

Figure 9A:
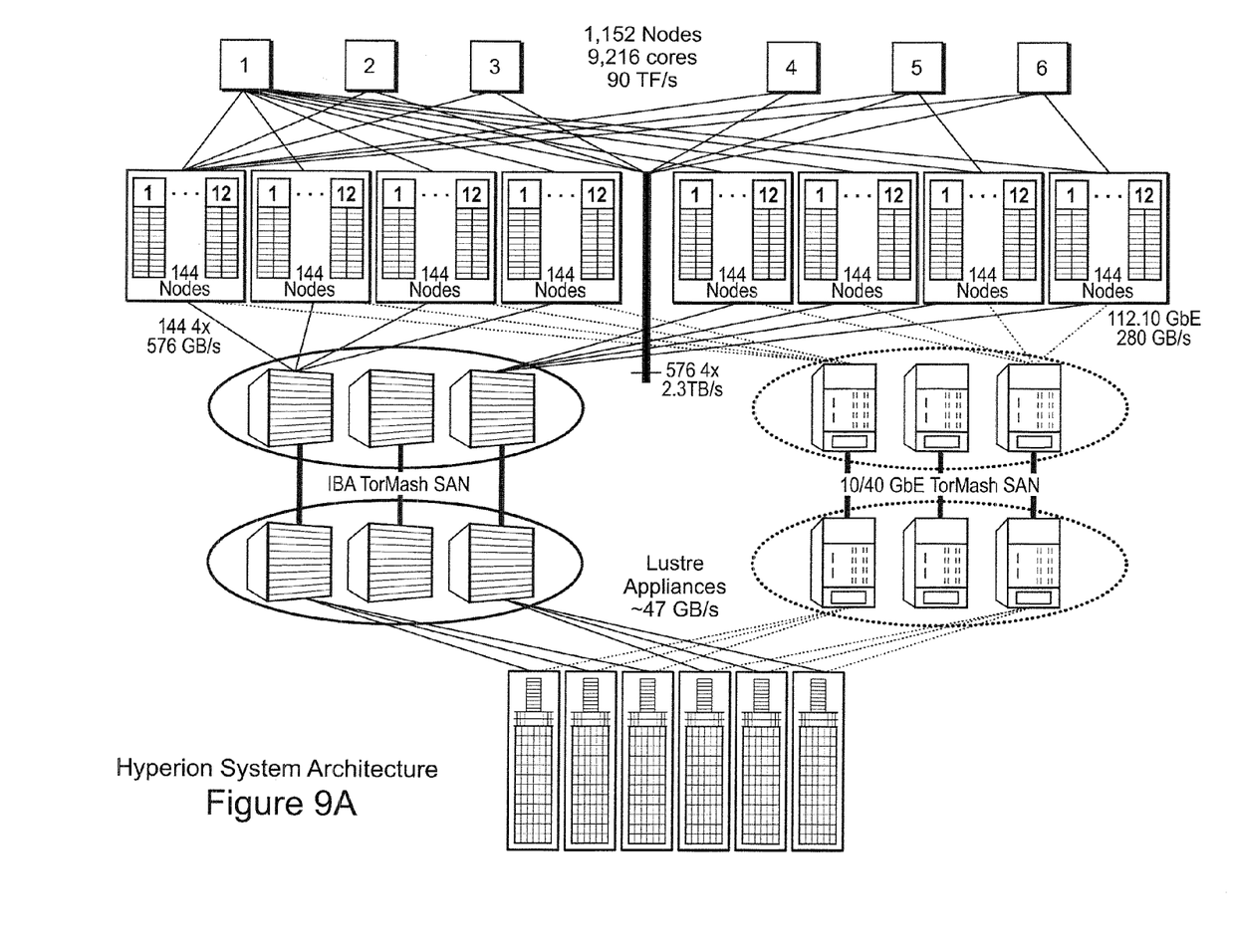
FIGS. 9A and 9B show a specific but non-limiting example high performance computing structure that may be used to implement the parallel pre-order validation and order matching in an electronic trading exchange in accordance with the second non-limiting example embodiment.
Figure 9B:
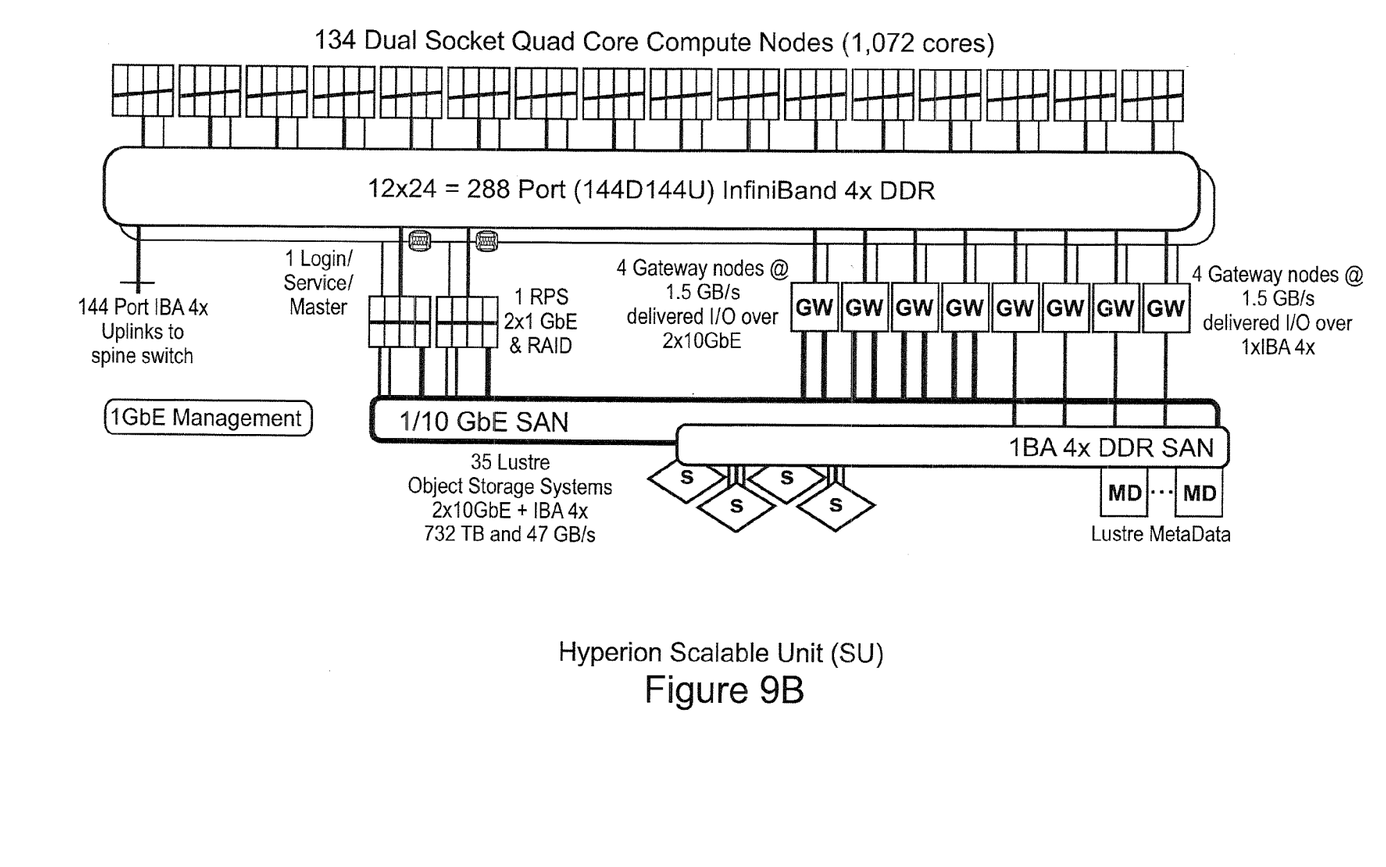

FIGS. 9A and 9B show a specific, but non-limiting, example high performance computing structure that may be used to implement the parallel order matching and multi-threaded order validation in an electronic trading exchange for the second example embodiment. A hyperion system architecture is shown in FIG. 9A and can include well over a thousand nodes. The hyperion system may use for example a version of the red hat operating system and includes 8 scalable units (SU) as shown in FIG. 9B. The scalable unit is interconnected with a fat-tree topology, e.g., an Infiniband network. Scalable units themselves are likewise connected by a fat-tree. Each scalable unit includes over a hundred computer nodes.

High performance technology such as InfiniBand (IB) remote direct memory access (RDMA) can be utilized for implementations like the examples shown in FIGS. 8 and 9A and 9B. InfiniBand is a switched fabric communications link used in high-performance computing that includes quality of service and failover and is designed to be scalable. The InfiniBand architecture specification defines a connection between processor nodes and high performance I/O nodes such as storage devices. InfiniBand forms a superset of the Virtual Interface Architecture. RDMA is a direct memory access from the memory of one computer into that of another without involving either one's operating system. This permits high-throughput, low-latency networking, which is especially useful in massively-parallel computer clusters.

In contrast to a shared memory implementation approach, a shared nothing (SN) architecture may alternatively be used to implement the technology in this application. A shared nothing architecture is a distributed and scalable computing architecture in which each node is independent and self-sufficient. There is no single point of contention across the system. This contrasts with systems that keep a large amount of centrally-stored state information, whether in a database, an application server, or any other similar single point of contention. An advantage of a shared nothing system as compared to a shared memory system is that the SN system offers essentially unlimited scalability. The technology in this case can be implemented in a system like that shown in FIG. 9A by using a gateway component on one computer to send a new unapproved order with a unique identifier using multicast. Both the matching engine and the order validator (there may be several risk validator threads on several computers, e.g., one for each trading firm) receive the multicast message and start working on the new order in parallel. If the order validator finishes validating the order, the order's validation status is marked as accepted (Y). If the order is matched, then the matching engine checks the validation status of the matching orders. That check can be accomplish very efficiently in systems like that in FIGS. 8, 9A, and 9B using of Remote Direct Memory Access.

The "shared nothing" approach described above may be combined with a dedicated hardware implementation of the order validator, e.g., using FPGA (Field Programmable Gate Arrays) or similar devices as opposed to general purpose computers. A hybrid approach of shared nothing and shared memory may also be used.

Consider this example situation. Assume there is a options exchange trading 500000 order books with a thousand members, and assume that the matching engine (ME) is partitioned to 1000 order books per ME instance. This means there are 500 ME partitions (processes). Also, assume that one risk process is assigned to each member for a total of 1500 busy processes. Most SMPs today may not be able to handle 1500 processes efficiently, thus they need to be distributed on a number of nodes. It may be cost efficient to use SMP on each node, but multiple nodes are still needed, and they must communicate efficiently using for example RDMA over IB or other media.

Although various embodiments have been shown and described in detail, the claims are not limited to any particular embodiment or example. None of the above description should be read as implying that a particular element, step, range, or function is essential. All structural and functional equivalents to the elements of the above-described preferred embodiment that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, component, or step in this specification is intended to be dedicated to the public.

What is claimed is:

1. A trade order processing method for reducing trade order processing latency in an electronic trading exchange, comprising the steps of:
   receiving at the electronic trading exchange trade orders to be matched against trade orders stored in a trade order book in a memory;
   storing at least some of the received trade orders in the trade order book before validating those received trade orders for trading risk;
   determining, by one or more processors, whether a first one of the received trade orders matches a second trade order stored in the trade order book; and
   verifying that the matched first and second trade orders are trade risk validated before executing a trade of the matched first and second trade orders.

2. The trade order processing method of claim 1, wherein the first trade order is stored in the trade order book if it does not match the second trade order, and
   the first trade order and the second trade order are validated after it is determined that the first one of the received trade orders matches the second trade order.

3. The trade order processing method of claim 1, wherein the step of determining whether the first trade order matches the second trade order is executed in parallel with validating one or both of the first and second trade orders.

4. The trade order processing method of claim 1, further comprising removing a trade order stored in the trade order book if the trade order is found invalid.

5. The trade order processing method of claim 1, wherein validating the trade orders includes calculating a risk associated with the trade orders and/or confirming properties of an account associated with the trade orders.

6. A non-transitory computer-readable storage medium having computer readable code embodied therein for executing a trade order processing method for reducing trade order processing latency in an electronic trading exchange, comprising:
 receiving at the electronic trading exchange trade orders to be matched against trade orders stored in a trade order book in a memory;
 storing at least some of the received trade orders in the trade order book before validating those received trade orders for trading risk;
 determining whether a first one of the received trade orders matches a second trade order stored in the trade order book; and
 verifying that the matched first and second trade orders are trade risk validated before executing a trade of the matched first and second trade orders.

7. An electronic trading exchange apparatus, comprising:
 a memory configured to store a trade order book for storing trade orders; and
 electronic circuitry, coupled to the memory, for reducing trade order processing latency in an electronic trading exchange and configured to:
  receive trade orders to be matched against trade orders stored in the trade order book;
  store at least some of the received trade orders in the trade order book before validating those received trade orders for trading risk;
  determine that a first one of the received trade orders matches a second trade order stored in the trade order book, and
  verify that the matched first and second trade orders are validated for trade risk before executing a trade of the matched first and second trade orders.

8. The electronic trading exchange apparatus according to claim 7, wherein the electronic circuitry is configured to remove a trade order stored in the trade order book if the trade order is not validated.

9. The electronic trading exchange apparatus according to claim 7, wherein the electronic circuitry is configured to validate trade orders by calculating a risk associated with each of the trade orders and confirming an account associated with each of the trade orders.

10. An electronic trading exchange apparatus, comprising:
 a memory configured to store a trade order book for storing trade orders; and
 a data processor, coupled to the memory, for reducing trade order processing latency when matching trade orders in an electronic trading exchange and programmed to:
  receive a first trade order for executing a trade with a second trade order stored in the trade order book,
  determine if the first trade order matches the second trade order stored in the trade order book before validating the first and second trade orders for trade risk,
  store the first trade order in the trade order book without trade risk validating the first trade order if the first trade order does not match the second trade order,
  validate the first trade order; and the second trade order for trade risk after the first trade order matches the second trade order, and
  execute a trade of the matched first and second trade orders if the first and second trade orders are successfully trade risk validated.

11. The electronic trading exchange apparatus in claim 10, wherein the data processor is programmed to remove an invalidated order from the order book.

12. An electronic trading exchange apparatus, comprising:
 a memory configured to store a trade order book for storing trade orders; and
 a processor, coupled to the memory, for reducing trade order processing latency when matching trade orders in an electronic trading exchange and configured to:
  receive trade orders to be matched against trade orders stored in the trade order book,
  store at least some of the received trade orders in the trade order book before validating those received trade orders for trade risk, and
  determine in parallel operations whether a first one of the received trade orders matches a second trade order stored in the order book and whether the first and second trade orders are valid trade orders from a trade risk standpoint,
  wherein the processor is further configured to complete the parallel operations before executing a trade of the matched first and second trade orders.

13. The electronic trading exchange apparatus according to claim 12, wherein the processor is further configured to:
 assign a first validation status marker to the first trade order and a second validation status marker to the second trade order, the first and second validation status markers indicating whether the first trade order or the second trade order has undergone validation processing.

14. The electronic trading exchange apparatus according to claim 13, wherein the validation status markers contain a status indicator from a group including at least one of: accepted, not accepted, and not yet calculated.

15. The electronic trading exchange apparatus according to claim 13, wherein the processor is further configured to:
 determine the status of the first validation status marker, and either reject the first one of the received trade orders or remove the first one of the received trade orders from the trade order book if the status of the first validation status marker is not accepted.

16. The electronic trading exchange apparatus according to claim 13, wherein the processor is further configured to:
 determine the status of the first validation status marker;
 store the first one of the received trade orders in the trade order book if the first one of the received trade orders does not match the second trade order and the first validation status marker is accepted; and
 determine the status of the second validation status marker if the first one of the received trade orders matches the second trade order and the first validation status marker is accepted.

17. The electronic trading exchange apparatus according to claim 13, wherein the processor is further configured to:
 store the first one of the received trade orders in the trade order book if the first one of the received trade orders does not match the second trade order and the status of the first validation status marker is not yet calculated.

18. The electronic trading exchange apparatus according to claim 13, wherein the processor is further configured to:
 validate the first trade order if the first trade order matches the second trade order and the status of the first validation status marker is not yet calculated; and
 validate the second trade order if the status of the first validation status marker changes from not yet calculated to accepted and the status of the second validation status marker is not yet calculated.

19. The electronic trading exchange apparatus according to claim 12, wherein the processor is configured to match the first trade order and the second trade order using a single-threaded processing and to validate the first trade order and the second trade order using multi-threaded processing.

20. The electronic trading exchange apparatus according to claim 12, wherein the electronic trading exchange apparatus is implemented on a high performance computing system that includes multiple parallel clusters of computing nodes coupled to shared memory to reduce order processing latency.

21. The electronic trading exchange apparatus according to claim 12, wherein the electronic trading exchange apparatus is implemented on a high performance computing system that includes a shared nothing computing architecture combined with dedicated hardware to reduce order processing latency.

22. The electronic trading exchange apparatus according to claim 12, wherein the electronic trading exchange apparatus is implemented on a high performance computing system that includes shared memory and shared nothing computer architectures to reduce order processing latency.

* * * * *